July 4, 1967 M. D. PENNINGS 3,328,875
METHOD OF ATTACHING CONDUCTORS TO TERMINALS
Original Filed Dec. 20, 1965 2 Sheets-Sheet 1

INVENTOR.
MATHEUS D. PENNINGS
BY Q. C. Smith
ATTORNEY

July 4, 1967 M. D. PENNINGS 3,328,875
METHOD OF ATTACHING CONDUCTORS TO TERMINALS
Original Filed Dec. 20, 1965 2 Sheets-Sheet 2

INVENTOR.
MATHEUS D. PENNINGS
BY Q.C. Smith
ATTORNEY

United States Patent Office 3,328,875
Patented July 4, 1967

3,328,875
METHOD OF ATTACHING CONDUCTORS TO TERMINALS
Matheus D. Pennings, 580 Arastradero,
Palo Alto, Calif. 94306
Original application Dec. 20, 1965, Ser. No. 515,005, now Patent No. 3,305,157, dated Feb. 21, 1967. Divided and this application Dec. 21, 1966, Ser. No. 603,579
3 Claims. (Cl. 29—471.1)

This is a divisional application of pending application Ser. No. 515,005 entitled Welding Machine and Method, filed on Dec. 20, 1965 by Matheus D. Pennings, now Patent No. 3,305,157.

This invention relates to an improved ultrasonic wire bonding process.

Certain known welders used in attaching connecting wires between semiconductor elements and the lead-out wires of the enclosing packages have the undesirable feature of requiring manual adjustment between welds to set the clearance between the welding tip and the semiconductor element during positioning prior to the first weld and then between the welding tip and lead-out wire during positioning prior to the second weld. Also, these machines commonly maintain pressure on the welding tip after completion of the second weld as the length of connecting wire is withdrawn in order to break it off adjacent the weld on the lead-out wire. This commonly disturbs the welded joint and causes the connecting wire to break undesirably at points along the weld.

It is therefore an object of the present invention to provide a welding process in which the welding tip is tilted rearwardly during formation of the second of a pair of welds in order to locate accurately the point at which the length of connecting wire breaks off when withdrawn.

It is another object of the present invention to provide an improved welding process which bows the connecting wire between welds and in which the feed length of connecting wire prior to formation of the first of a pair of welds is adjustable.

Other and incidental objects of the present invention will be apparent from a reading of this specification and an inspection of the accompanying drawing in which.

Figure 1:
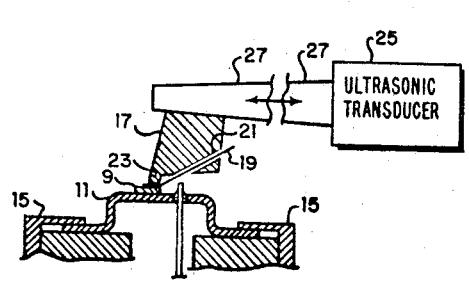
FIGURE 1 is a sectional view of the welding tip in the first weld position.

Referring to FIGURE 1, there is shown a semiconductor chip or work piece 9 attached to a header 11 which includes a lead-out wire or connection post 13. The assembly is clamped in a suitable vise 15 which is movable by conventional means to position the header 11 under the welding tip 17. A connection wire 19 is fed through a channel 21 into position under the generally planar or grooved working surface 23 of welding tip 17.

In a typical operation, the welding tip is first positioned above the work piece 9 at a first selected elevation with the wire 19 disposed between surface 23 of tip 17 and the work piece 9. The vise 15 is positioned to align the tip 17 over the area to be welded and the tip is then brought down with the planar surface 23 substantially plane-parallel to the surface of work piece 9. This presses the wire 19 into contact with work piece 9 with a force determined by the weight of tip 17. Ultrasonic transducer 25 attached to the welding tip 17 through arm 27 is energized momentarily to reciprocatingly actuate the arm 27 and tip 17 in a longitudinal direction. This completes the first weld and the tip 17 is elevated well above the work piece leaving the wire 19 bonded to work piece 9 and free to slide through channel 21 in the tip.

Figure 2:
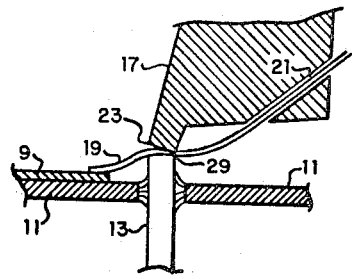
FIGURE 2 is a sectional view of the welding tip in the second weld position.

In preparation for the second weld, i.e., of the wire 19 to the post 13, the tip 17 is tilted rearwardly, typically by a few degrees, and is positioned at a second selected elevation above the post 13 located beneath the tip 17. The tip 17 is brought down with surface 23 in skew relationship to the end of post 13, as shown in FIGURE 2. This exerts unequal pressure along the weld length of wire 19 so that when transducer 25 is again momentarily energized as discussed above, the second weld is formed and the cross sectional area of wire 19 is left much smaller at the rear or outer side 29 of post 13 than elsewhere along the weld length. The wire 19 is then pulled away from the post 13 (preferably with tip 17 still in position) in order to break off the wire 19 precisely at location 29 rather than at any random location along the weld or elsewhere along the wire 19. Following completion of the second weld, the tip is reset to the plane-parallel relationship of surface 23 with respect to another area of work piece 9, the wire 19 is advanced a selected amount under the tip surface 23 and the tip is again positioned at the first selected elevation above the work piece 9 in preparation for the first of two welds in the next wire connecting operation.

Figure 3:
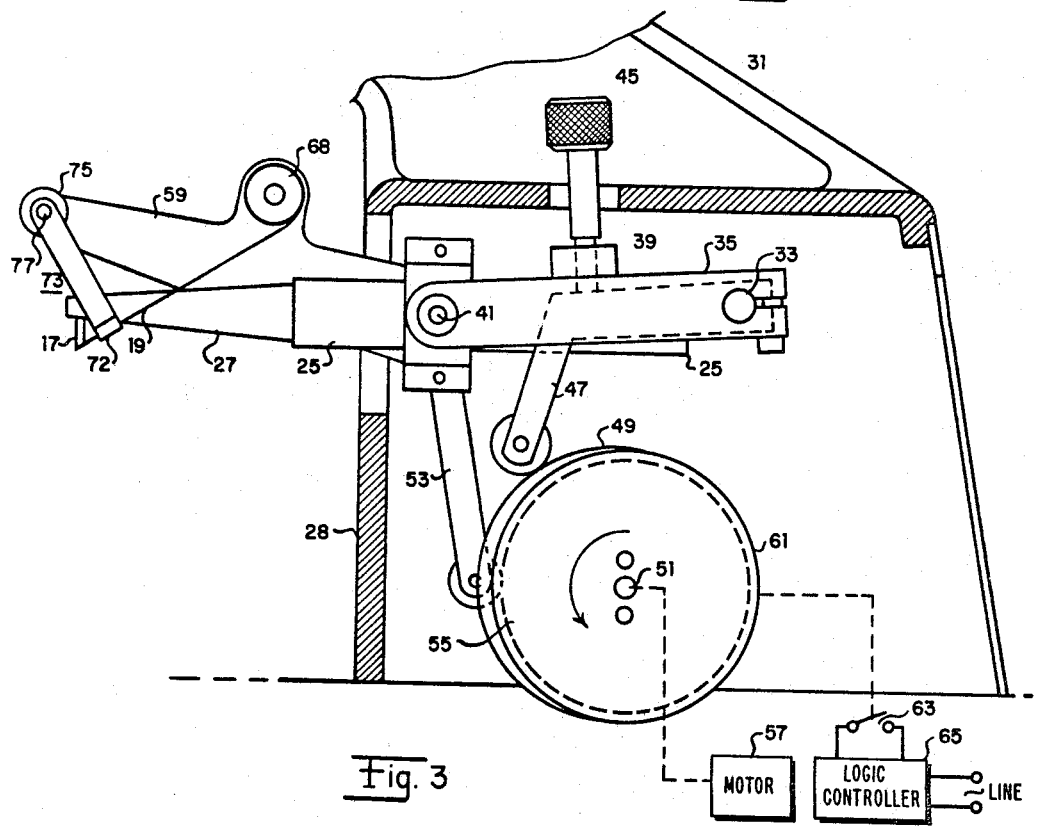
FIGURES 3, 4, and 5 are side, front and top views, respectively, of the machine apparatus of the present invention which performs the operations shown in FIGURES 1 and 2.
Figure 5:
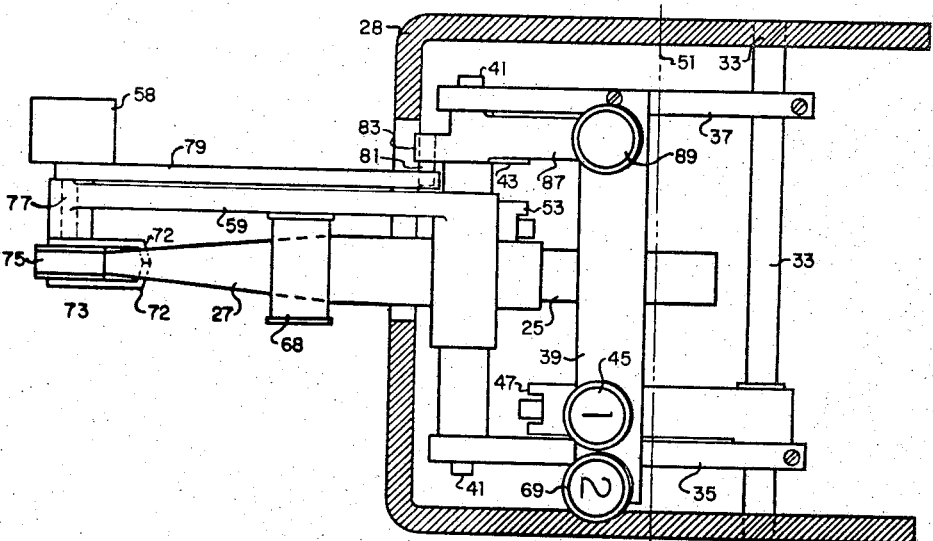
Figure 4:
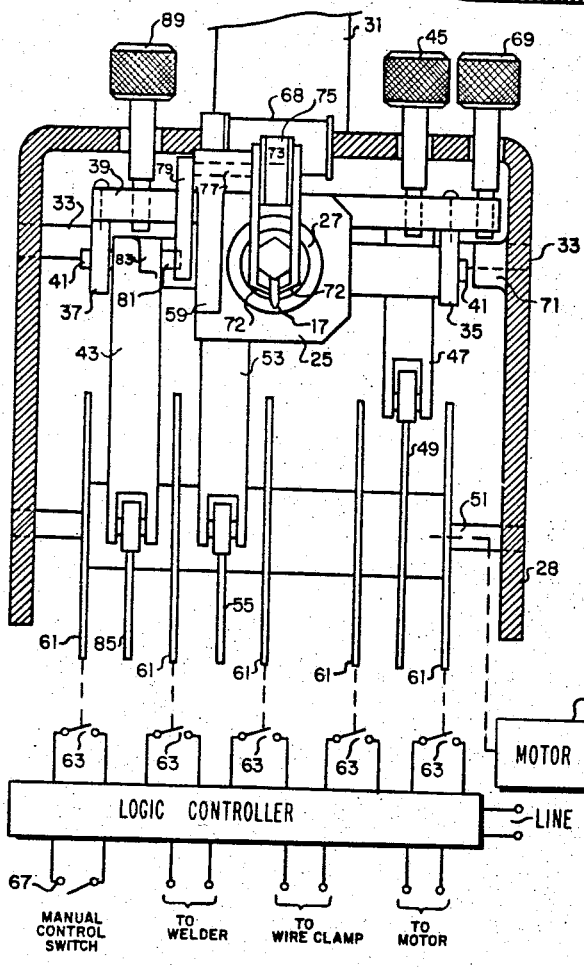

The features of the welding operation described in connection with FIGURES 1 and 2 is accomplished cyclically by the apparatus shown in the side, front and top views, respectively, of FIGURES 3, 4, and 5. FIGURES 3, 4, and 5 show a housing 28 including a portion of a generally upright arm 31 on which may be mounted a viewing microscope and illumination means that form no part of this invention. Shaft 33 is rotatably supported in the opposite sides of housing 28 and has a pair of arms 35, 37 clamped to the shaft for rotation therewith. These arms 35, 37, joined by cross bar 39 and clamped to the shaft 33 form a rigid frame which rotates about the axis of shaft 33. On the forward end of this frame, there is a shaft 41 which serves as the pivot for the wire feed advancer arm 43 and for the welder assembly including transducer 25 and arm 27.

In operation, the rotational position of the frame about the axis of shaft 33 is determined by the setting of thumbscrew 45 in cross bar 39. This thumbscrew bears against arm 47 which is pivoted about shaft 33 and which is positioned by the cam 49 on camshaft 51. Thus adjusting the thumbscrew 45 elevates cross bar 39 and hence the arm 35, 37 above arm 47 and, for a given rotational position of the welder assembly about shaft 41 carried by arms 35, 37, also sets the first elevation of the tip 17 above the work piece, as previously described. Note that elevating the arms 35, 37 by adjusting thumbscrew 45 causes the cam follower arm 53 (attached to the welder assembly for pivoting it about shaft 41) to travel along a substantially vertical path on cam 55 with the effect that the arms 35, 37 pivot about shaft 33 and the welder assembly thus moves in a substantially vertical direction. In FIGURE 5, the camshaft 51 and atached cams have been omitted for clarity of the view.

With the first elevation of tip 17 thus set, camshaft 51 may be rotated by motor 57 connected thereto through such conventional means as belts or gears in order to produce the first weld previously described. By properly shaping cam 49 or cam 55, or both, rotation of this shaft 51 causes arm 47 or arm 53 to move counterclockwise, thereby causing tip 17 to move downward into contact with a work piece positioned therebeneath. Weight 58 (FIGURE 5) mounted on arm 59 which pivots with the welder assembly 25, 27 about shaft 41 determines the desired tip contact pressure as the cam follower arm 53 lifts away from the associated cam along a portion of the cam recession. Continued rotation of camshaft 51 causes one of cams 61 to actuate a switch 63 connected to logic controller 65 for momentarily energizing the ultrasonic transducer 25. This produces the first weld previously described in connection with FIGURES 1 and 2 during the time tip 17 is in pressure contact with a workpiece. Motor 57 may be programmed by controller 65 to cease rotating camshaft 51 momentarily during the first weld. Rotation of camshaft 51 thereafter causes cam 49 to lift arm 47 and thereby elevate welding tip 17 well above the workpiece.

When the second weld previously described is to be produced, manual control switch 67 is actuated to have motor 57 rotate camshaft 51 a preselected amount. This latter rotation causes arm 47 to drop down so that arms 35, 37 and the shaft 41 carried thereby pivot downward about shaft 33. The extent to which the arms 35, 37 drop downward is determined by the setting of thumbscrew 69 carried by cross bar 39 as this thumbscrew bears against the boss 71 on housing 28. At the same time, arm 53 pivots clockwise about shaft 41 a selected amount so that by properly controlling these two movements the elevation of tip 17 which tended to move downward as arm 47 moved downward remains substantially unchanged because of the upward pivoting of the welder assembly 25, 27 by arm 53 bearing against cam 53. Note, however, that the tip 17 is now tilted rearward, as described in connection with FIGURE 2, and is at the previously described second elevation selected by thumbscrew 69 just prior to formation of the second weld. Actuation of manual control switch 67 thus causes motor 57 to rotate cam shaft 51 a selected amount to cause arm 53 bearing against cam 55 to pivot counterclockwise and thereby bring the tip 17, now tilted, into pressure contact with a work piece. Again weight 58 determines the proper tip contact pressure as arm 53 lifts away from cam 55 during a portion of the cam recession. Continued rotation of camshaft 51 while tip 17 is in contact with the work piece causes one of the cams 61 to actuate a switch 63 which, in turn, causes logic controller to energize ultrasonic transducer 25 momentarily to produce the previously described second weld.

After completion of the second weld, motor 57 continues to rotate camshaft 51 a preselected amount in order to actuate the wire feeding and breaking mechanism. As previously described in connection with FIGURES 1 and 2, the welded wire 19 must be withdrawn from the second weld in order to break it at the weakened point 29. The wire 19 from supply spool 68 mounted on arm 59 passes between the jaws 72 of a magnetic wire clamp 73 positioned behind the welding tip 17. When magnet coil 75 is energized by controller 65, the jaws 72 which form part of the magnetic circuit are drawn together about wire 19 to clamp it in position. Thus, with tip 17 preferably still in pressure contact with the work piece following completion of the second weld, magnet 75 is energized by controller 75 to clamp the wire 19. This magnetic wire clamp assembly 73 is mounted to rotate with shaft 77 which passes rotatably through arm 59 and which is attached to arm 79. Thus by rotating arm 79 upward, jaws 72 clamped around wire 19 draw it back away from the work piece a few thousandths of an inch to break it off at weakened point 29 along its length. Arm 79 is rotated upward by pin 81 which rides in a slot in arm 79 and which is mounted on the forward protrusion 83 of arm 43 that bears against cam 85. Continued rotation of camshaft 51 by motor 57 may now lift arm 47 upward and arm 53 inward to reestablish the frame including arms 35, 37 cross bar 39 and shaft 41 in the first-named position and hence to reestablish tip 17 in the level attitude well above a new site on a work piece. Also, this continued rotation of camshaft 51 causes arm 43 to pivot inwardly toward the shaft 51 which causes pin 81 and the end of arm 79 to move downwardly, thereby rotating the wire clamp 73 in a direction to carry the jaws 72 and the wire 19 clamped therebetween forward toward the tip 17. The extent to which the wire 19 is advanced beneath the tip 17 in preparation for the first weld of the next set is determined by the extent of inward travel of arm 43 and hence by the extent of the upward travel of rearward protrusion 87 on arm 43. Thumbscrew 89 carried by cross bar 39 above this rearward protrusion 87 of arm 43 thus limits the travel of arm 43 and thus controls the advance of the wire 19 following completion of the second weld. Wire clamp 73 remains energized by controller 65 during substantially the entire cycle of operation, being deenergized to permit the wire 19 to slide freely only during the interval between the first and second welds when the work piece is being moved to position the wire 19 between the desired first and second weld points.

Where it is essential that this span of wire 19 between desired weld points be bowed in order to cross over skew-related wires without contacting them, the machine of the present invention may also be operated to bow the span of connecting wire 19. This is accomplished by bringing the tip 17 down upon the lead out wire or post 13 while tilted rearwardly as previously described and as shown in FIGURE 2. However, just prior to energizing the ultrasonic transducer 25, cam 49 on shaft 51 may be shaped to raise the arm 47 which in turn raises the arms 35, 37 and pivot shaft 41 about pivot shaft 33. At the same time, cam 55 may also be shaped so that arm 53 rotates inwardly about shaft 41 a sufficient amount to lift away from cam 55 and thereby maintain the tip 17 in contact with the post to be welded at the desired weighted pressure. This results in extension by a few thousandths of an inch of the dimension from fixed shaft 33 to the tip 17, which extension in length bows the span of connecting wire 19 between the first weld and the post. While so bowed and held in place by tip 17, wire 19 may be welded to the post 13 as previously described by momentarily actuating ultrasonic transducer 25. Since tip 17 is tilted rearwardly by more than a selected amount when brought down to press the wire 19 against post 13 prior to the above-described length extension and since the tip 17 may be tilted rearwardly a selected amount during formation of the second weld, the wire 19 is adequately dented by the rear edge of tip 17 such that subsequent withdrawal of the wire 19 away from the post 13 after formation of the second weld causes the wire to break at point 29 as previously described.

Therefore, the welding machine of the present invention permits the welding tip to be positioned at independently selected elevations above a work piece prior to formation of each of a pair of welds at the ends of a connecting wire. Also, the welding machine of the present invention permits the welding tip to be tilted rearwardly in order accurately to establish the parting point on the connecting wire. Further, adjustable wire feed in the present invention permits the connecting wire to be advanced a selected amount prior to the first of a pair of welds.

I claim:

1. The method of attaching a length of conductor to a plurality of spatially separated terminals comprising the steps of:

positioning the conductor near an end thereof adjacent a terminal;

applying a first force to said conductor substantially uniformly distributed over a selected length thereof in a direction toward the surface of the terminal;

ultrasonically vibrating the conductor for a selected interval while said first force is applied to attach said conductor to said terminal;

positioning the conductor along the length thereof adjacent another terminal;

applying a second force to said conductor over a selected length thereof in a direction toward the surface of said other terminal;

ultrasonically vibrating the conductor for a selected interval while said second force is applied to attach said conductor to said terminal;

decreasing the cross-sectional area of the conductor substantially at the end of said selected length remote from the first-named terminal to an area which is smaller than the cross-sectional area along all other portions of said selected length of the conductor; and withdrawing the remaining length of conductor in a direction away from the first-named terminal to part the conductor at the decreased cross-sectional area.

2. The method as in claim 1 wherein the step of decreasing the cross-sectional area of the conductor is accomplished concurrently with the two preceding steps by applying force to said conductor over a selected length thereof with a force distribution which increases with length in a direction away from the first-named terminal and by ultrasonically vibrating the conductor for a selected interval while such force is applied.

3. The method as in claim 1 wherein following said step of applying force to said conductor in a direction toward the surface of said other terminal, there is provided the additional step of:

moving the length of conductor in a direction toward the first-named terminal to bow the conductor over a portion of the length thereof between the terminals.

References Cited

UNITED STATES PATENTS

| | | | |
|---|---|---|---|
| 2,697,954 | 11/1954 | Sowter | 29—470.1 |
| 3,083,595 | 4/1963 | Frank et al. | 228—44 |
| 3,087,239 | 4/1963 | Clagett | 29—471.1 |
| 3,216,640 | 11/1965 | Szasz | 228—44 |

JOHN F. CAMPBELL, *Primary Examiner.*

MARTIN L. FAIGUS, *Assistant Examiner.*